3,554,709
SELECTIVE ION-EXCHANGE SEPARATION
OF ALKALI METALS
Kent A. Orlandini, West Chicago, and Johann Korkisch, Hinsdale, Ill., assignors to the United States of America as represented by the United States Atomic Energy Commission
No Drawing. Filed June 17, 1968, Ser. No. 737,356
Int. Cl. C01d 3/16, 11/04; B01j 1/04
U.S. Cl. 23—312                                    5 Claims

ABSTRACT OF THE DISCLOSURE

A method of separating alkali metal values from other elements contained in an acid feed solution by evaporating the solution to near dryness and dissolving the resulting residue in a solvent solution consisting of 2-thenoyltrifluoroacetone in pyridine and passing the resulting organic feed solution over a cation-exchange resin bed whereby the alkali metal values are retained on the resin and the other elements pass through the bed with the effluent.

CONTRACTUAL ORIGIN OF THE INVENTION

The invention described herein was made in the course of, or under, a contract with the United States Atomic Energy Commission.

BACKGROUND OF THE INVENTION

Most ion-exchange methods for the rapid and selective isolation of alkali metals are based on the retention of the heavy alkali metal ions on inorganic cation-exchange materials such as hetero polyacids, for example, ammonium molybdophosphate (AMP), complex cyanides of the transition metals and zirconium phosphate. Of these, AMP has most frequently been used for the isolation of cesium-137 from a great variety of materials including uranium fission products. The inorganic ion-exchange materials are advantageous over organic ion-exchange materials in that they are highly resistant to radiation damages and selectively absorb the heavy alkali metals under both acidic and neutral conditions. There are many disadvantages also. For example, in the case of AMP, the exchanger has a finite solubility in aqueous solutions and peptizes slowly in pure water. Furthermore, AMP alone is impervious to liquids so that in a column process supports such as asbestos or silica gel must be added to provide porosity. Another disadvantage, which is most prominent with AMP and the complex cyanides, is that recovery of the alkali metal such as cesium, once absorbed on the exchanges, is difficult. Recovery of the alkali metal necessitates the use of strongly salted solutions, for example, ammonium nitrate, or the dissolution of the exchange material in an alkaline solution. Thus, in both cases, the isolated heavy alkali metal is accompanied by comparatively large amounts of chemicals. Consequently, the preparation of carrier-free alkali metal tracer solutions such as one of cesium-137 which solely contains this radionuclide is only possible after carrying out additional separation steps.

Synthetic organic cation exchangers have not been used too frequently for the isolation of alkali metal ions from complex mixtures, for example, the recovery of cesium-137 from fission product solutions. The reason for this is that the organic exchangers are not very selective for the alkali metals and are susceptible to damage from radiation. With respect to the absorption of cesium-137 from dilute acid or neutral solutions, the selectivity is poor in that many other elements, including uranium and most of the metal ions contained in uranium fission product solutions, are co-adsorbed with the cesium so that lengthy chromatographic ion-exchange procedures and additional steps are required to purify the alkali metal.

SUMMARY OF THE INVENTION

We have invented a process for the separation of alkali metals which eliminates many of the before-described problems associated with existing ion-exchange separation methods. The process of this invention comprises evaporating an acid solution containing the alkali metal values and other elements to near dryness and dissolving the resulting residue in a solution consisting of 2-thenoyltrifluoroacetone (hereinafter referred to as TTA) dissolved in pyridine. The resulting organic feed solution is then passed over a strongly acid organic cation-exchange resin bed which adsorbs the alkali metal ions present, while allowing the solution containing the remaining elements to pass through the bed. The pure alkali metals can then be eluted from the resin bed with a mineral acid from which they may easily be separated.

It is therefore one object of this invention to provide a process for separating alkali metal values from other elements.

It is another object of this invention to provide a process for separating alkali metal values from other elements which has fewer steps and is easier to use than existing processes.

DESCRIPTION OF THE PREFERRED EMBODIMENT

These and other objects of the invention can be obtained by heating a hydrochloric acid solution containing alkali metal values and other elements to near dryness and dissolving the resulting residue in a solution consisting of 0.1 M TTA in pyridine. The resulting organic feed solution is then passed over a cation-exchange resin bed. The alkali metal ion present is adsorbed by the cation-exchange resin and the other ions present in the solution pass through the bed with the effluent and may be recovered for further processing or disposed of as circumstances permit. The alkali metal ions are eluted from the cation resin by passing a solution of 6 M hydrochloric acid over the bed. The resulting effluent is then heated to drive off the hydrochloric acid and recover the pure alkali metal values.

It is important that when the acid solution is evaporated, compounds of the elements present in the solution be formed which are soluble in the pyridine or other organic solvent. Thus, it is preferred that the feed solution contain hydrochloric acid, since most elements will readily form a chloride salt. This is particularly true of fission products of uranium such as zirconium and niobium. When elements of this nature are not present, nitric acid will work quite satisfactorily. Some metals, for example, magnesium, are best dissolved in a glacial acetic acid solution, thus forming the acetate which is then readily soluble in the pyridine solution.

It is important that the acid solution be evaporated to near dryness so that a soluble salt is formed and to remove the excess acid and solution volume. Although some salts may be dried completely, it is preferable that they remain slightly moist or that a small amount of water be added to facilitate dissolution of the salts in the pyridine solution.

After near dryness is achieved, the resulting residue is dissolved in a solution of TTA dissolved in pyridine. The amount of TTA necessary is dependent upon the quantity of metal ions in the feed solution available for complexing plus a slight excess of from 0.01 to 0.1 M. Thus the concentration of TTA needed may be readily calculated by one skilled in the art.

The preferred organic solvent is pyridine. However, an organic diluent may be used along with the pyridine, provided a minimum of pyridine is present. The pyridine is necessary to adjust the basicity of the solvent to form cations of the elements present and to ionize the TTA in the solution. In the following table are given the distrbution coefficients of sodium and cesium in a solution containing 0.1 M TTA, 10% pyridine and 90% of the diluent listed to show that it is possible to replace a portion of the pyridine with an organic diluent. Although the distribution coefficients given are for sodium and cesium, they are representative of all the alkali metals.

|  | Distribution coefficients (Kd)[1] | |
|---|---|---|
|  | Na | Cs |
| Diluent: |  |  |
| Methanol | 4,810 | 2,010 |
| Ethanol | 67,526 | 4,434 |
| Acetone | 33,768 | 6,530 |
| Tetrahydrofuran | 84,420 | 8,420 |
| Benzene | >600,000 | 8,530 |
| Nitrobenzene | >10$^5$ | 3,200 |
| Isoamylacetate | 12,000 | 6,000 |
| Acetylacetone | 112,560 | 20,220 |
| Quinoline | 67,536 | 2,640 |

[1] Kd = amount of ion per unit of resin amount of ion per unit of solution.

After the alkali metal and other impurities have been dissolved in the TTA-containing solvent solution, the resulting organic feed solution is passed over a cation-exchange resin bed in the H+ cycle. All cation-exchange resins are suitable for the process of this invention. A resin commercially available under the name of Dowex 50W cross linked to 8% was used for the investigations for the process of this invention. Dowex 50W is made according to Example I of U.S. Pat. No. 2,366,007, granted to D'Alelio on Dec. 26, 1944. The particle size of the resin may vary widely, but particles between 100 and 200 mesh were used with especially good results.

By passing the organic solution over the resin bed, the alkali metal values are absorbed onto the resin bed and any other elements which are present in the solution pass through the resin with the effluent which may then be disposed of or processed for further separation of the elements present therein.

After completion of the sorption step, the cation-exchange bed is washed to remove any residual impurities and chemical compounds which may be present. This is accomplished by first passing a solution of 0.1 M TTA in pyridine over the bed to remove any metal impurities which may be present. The residual TTA is then removed by washing the bed with pyridine which is in turn washed from the resin by passing water over the bed.

The alkali metal values which have been adsorbed on the cation-exchange resin are eluted from the bed by passing hydrochloric acid over the resin bed. A solution containing 5–6 M of the acid is preferred, although higher or lower concentrations will also work.

Upon completion of the elution step, the alkali metals present may be recovered from the eluate by processes well known to those skilled in the art. One method would be to dry the eluant at from 200 to 300° C. This could not only drive off the hydrochloric acid but also any organic residues which may also be present in the effluent, leaving the pure alkali metal values.

This process is effective for the separation of the alkali metals, that is, lithium, potassium and rubidium, in addition to cesium and sodium, from the other elements present. The separation of francium from the other elements was not confirmed due to unavailability of the metal, but it is presumed to separate as the rest of the group. In addition, the ammonia ion, since it behaves like the alkali metals, is also adsorbed by the process of this invention. Separation of the alkali metals from each other is not possible with this process and may be accomplished by methods familiar to thos skilled in the art.

This process is applicable for separating the alkali metals from all other elements except that appreciable adsorption on the cation-exchange resin is shown by thallium and some retention was also noted in the case of antimony and bismuth.

The selectivity of the cation-exchange resin for the alkali metals in the TTA-pyridine medium was found to be due to the inability of the alkali metals to form stable pyridine-soluble TTA-chelates in the presence of the cation resin, while the majority of the other metal ions form strong complexes with TTA and hence are not retained by the resin. These complexes are readily soluble in the pyridine and hence this solvent is acting as an extractant for this group of elements while the alkali metals are taken up by the resin.

The separation process which constitutes the present invention is also applicable to the isolation of larger quantities of alkali metals from other materials such as trace impurities contained in alkali metal reactor coolants, soils, rocks and organic matter. Since large amounts of the chlorides or other salts of sodium, potassium, alkaline earths and other elements show a limited solubility in the TTA-pyridine solvent, the solvent may be modified by replacing half of the pyridine with water. This increases the solubility of sodium chloride in the solvent by about 1000 times, while decreasing the distribution coefficients of the alkali metals in the solvent only slightly. Care must be taken, however, because too high a concentration of sodium chloride will cause the formation of two phases, an upper phase consisting mainly of TTA in pyridine and a lower phase consisting mainly of water saturated with sodium chloride.

The following examples are given as illustrative of the process of this invention and are not to be taken as limiting the scope or extent of the invention.

EXAMPLE I

To 50 μl. of a uranium fission product solution containing cerium-144, zirconium-95, niobium-95, ruthenium-106, promethium-147, cesium-137, strontium-90, technetium and antimony-125, was added 2–3 ml. of concentrated hydrochloric acid and the solution was evaporated at 200–300° C. to about 0.5 ml. After cooling down to room temperature, this moist residue was dissolved in 9–10 ml. of a solution containing 0.1 M TTA dissolved in pyridine.

The resin bed was prepared by soaking 1 gram of Dowex 50 X-8 (100–200 mesh) in a few milliliters of the 0.1 M TTA in pyridine solvent solution. The resin was transferred to anion-exchange column 0.5 cm. in diameter and 25 cm. in length where it was supported by a pad of quartz wool. After washing with 10–15 ml. of solvent solution, the column was ready.

The prepared feed solution was passed through the column at a rate corresponding to the back-pressure of the resin column. The column was then washed with 30–40 ml. of the solvent solution to remove any impurities which may be present. Any residual TTA was removed by washing the column with 5 ml. of pyridine, which was in turn removed by passing distilled water over the bed.

The cesium was then eluted from the column by passing 10–20 ml. of 6 M hydrochloric acid over the bed using a flow rate corresponding to the back-pressure of the resin column. The effluent was evaporated to dryness and it was determined that 99.9% of the cesium-137 present in the fission product solution was recovered with a radiochemical purity of 99%.

EXAMPLE II

50 μl of a fission product solution containing strontium-90, promethium-147, cesium-137, cerium-144, antimony-125, ruthenium-106 and technetium-99 was treated with 2–3 ml. of nitric acid. The resulting solution was evaporated and the same procedure described in the previous example was followed. After evaporation of the acid effluent solution, it was determined that 99.9% of the cesium-137 was present and that the purity was 99%.

EXAMPLE III

Deuteron-irradiated magnesium metal was dissolved in glacial acetic acid with heating. The resulting solution was evaporated to remove excess acid and reduce the volume. The viscous concentrate of magnesium acetate in residual acetic acid was dissolved in pyridine. TTA in pyridine was added to the pyridine-magnesium acetate solution in an amount necessary to complex all the magnesium (i.e., 2 moles of TTA per mole of mg.) with an excess of this reagent equivalent to 0.2 M free TTA. This mixture was diluted with an equal volume of ethanol and was passed through a strongly acidic cation-exchange column (Dowex 50, X–8, 100–200 mesh) which had been pretreated with pyridine containing 0.1 M TTA. A wash solution of 0.1 M TTA in pyridine was passed through the resin column following the feed solution so that residual TTA–complexed impurities were removed from the sodium-22. The TTA was washed from the column with pyridine alone. The pyridine in turn was removed by a water wash. Finally the sodium was eluted with 6 M hydrochloric acid. 99.9% of the sodium-22 was recovered with a purity of 99%.

It can readily be seen from the preceding examples that the process of this invention gives outstanding results in the selective separation of the alkali metals from the other elements with which they may be associated.

It will be understood that the invention is not to be limited to the details given herein but that it may be modified within the scope of the appended claims.

The embodiments of the invention in which an exclusive property or privilege is claimed are defined as follows:

1. A method for separating alkali metal cations from multivalent metal values, whose cations are capable of forming complexes with 2-thenoyltrifluoroacetone present in an acid feed solution comprising:
   (a) evaporating the solution to near dryness, thereby forming a soluble residue;
   (b) dissolving said residue in an organic solvent solution containing sufficient pyridine to adjust the basicity of said organic solvent solution to form cations of the multivalent metal values dissolved therein and to ionize 2-thenoyl-trifluoroacetone in said organic solvent solution, and sufficient 2-thenoyltrifluoroacetone to complex said multivalent metal cations, but not said alkali metal cations, dissolved in said organic solvent solution, thereby forming an organic feed solution;
   (c) passing said organic feed solution over a cation-exchange resin bed, whereby said alkali metal cations present are adsorbed on said resin and the complexed multivalent metal cations pass through said bed; and
   (d) eluting said alkali metal cations from said bed.

2. The method of claim 1 wherein said acid feed solution contains a member of a group consisting of hydrochloric acid and nitric acid.

3. The method of claim 1 wherein the organic solvent solution consists of an organic diluent containing 10% pyridine and sufficient 2-thenoyltrifluoroacetone to complex the multivalent metal cations dissolved therein in addition to 0.01 to 0.1 M in excess.

4. The method of claim 3 wherein the organic solvent solution consists of 2-thenoyltrifluoroacetone in pyridine.

5. The method of claim 1 wherein said alkali metal cations are eluted by passing a solution of 5–6 M hydrochloric acid over said resin bed.

References Cited

UNITED STATES PATENTS

| | | | |
|---|---|---|---|
| 2,980,499 | 4/1961 | Goodenough | 210—38X |
| 3,017,242 | 1/1962 | Ames | 210—38X |
| 3,118,831 | 1/1964 | Morris | 210—38 |
| 3,179,503 | 4/1965 | Horner | 23—312 |
| 3,305,321 | 2/1967 | Teumac | 23—312 |
| 3,306,712 | 2/1967 | Goodenough | 23—312 |
| 3,450,640 | 6/1969 | Bonnin | 23—312X |
| 3,453,214 | 7/1969 | Bonnin | 23—312X |
| 3,458,290 | 7/1969 | Hultgren | 210—38X |

FOREIGN PATENTS

| | | | |
|---|---|---|---|
| 509,857 | 2/1955 | Canada | 23—312 |

OTHER REFERENCES

Kahlenberg et al., Amer. Chem Society, Journal, vol. 30, 1908, pp. 1104 to 1115.

Nuclear Science Abstracts, vol. 20, p. 702, #597, 1966.

Seamaster et al., Chemical Engineering, Aug. 22, 1960, pp. 115 to 120.

Simpson et al., Chemical Engineering Progress, vol. 50, #1, 1954, pp. 45 to 49.

Small, J. Inorg. Nucl. Chem, 1961, vol. 19, pp. 160 to 169.

West, Laboratory Methods, vol XLIII, #255, January, 1951, pp. 41 to 45.

NORMAN YUDKOFF, Primary Examiner

S. J. EMERY, Assistant Examiner

U.S. Cl. X.R.

23—31, 89, 102; 210—38